United States Patent
Amadeo et al.

(10) Patent No.: US 8,558,752 B2
(45) Date of Patent: Oct. 15, 2013

(54) VARIABLE PITCH MANDREL WOUND ANTENNAS AND SYSTEMS AND METHODS OF MAKING SAME

(75) Inventors: Paul Amadeo, San Diego, CA (US); Jose Flores, Chula Vista, CA (US); Robert Kraft, Escondido, CA (US)

(73) Assignee: Cubic Corporation, San Diego, CA (US)

( * ) Notice: Subject to any disclaimer, the term of this patent is extended or adjusted under 35 U.S.C. 154(b) by 357 days.

(21) Appl. No.: 12/950,636

(22) Filed: Nov. 19, 2010

(65) Prior Publication Data

US 2011/0205140 A1 Aug. 25, 2011

Related U.S. Application Data

(60) Provisional application No. 61/262,836, filed on Nov. 19, 2009.

(51) Int. Cl.
*H01Q 21/00* (2006.01)

(52) U.S. Cl.
USPC .......................................... 343/867; 343/742

(58) Field of Classification Search
USPC ..................... 343/741, 742, 866, 867; 29/600
See application file for complete search history.

(56) References Cited

U.S. PATENT DOCUMENTS

| | | | |
|---|---|---|---|
| 6,023,837 A | 2/2000 | Finn | |
| 6,055,720 A | 5/2000 | Finn et al. | |
| 6,067,235 A | 5/2000 | Finn et al. | |
| 6,295,720 B1 | 10/2001 | Finn et al. | |
| 6,719,206 B1 | 4/2004 | Bashan et al. | |
| 7,229,022 B2 | 6/2007 | Rietzler | |
| 7,581,308 B2 * | 9/2009 | Finn | 29/600 |
| 2002/0100810 A1 | 8/2002 | Amadeo | |
| 2005/0237239 A1 * | 10/2005 | Kuo et al. | 343/700 MS |
| 2008/0055046 A1 | 3/2008 | Shimizu | |
| 2008/0314990 A1 | 12/2008 | Rietzler | |

FOREIGN PATENT DOCUMENTS

| | | |
|---|---|---|
| EP | 0790667 A1 | 8/1997 |
| FR | 2886466 A1 | 12/2006 |

OTHER PUBLICATIONS

PCT International Search Report and Written Opinion mailed Apr. 1, 2011; International Application No. PCT/US2010/057486, 10 pages.

* cited by examiner

*Primary Examiner* — Hoang V Nguyen
(74) *Attorney, Agent, or Firm* — Kilpatrick Townsend & Stockton LLP

(57) ABSTRACT

A system and method for fabricating a mandrel wound antenna are provided. The method includes securing a first end of a wire to a first portion of a mandrel tool, where the mandrel tool includes a faceplate supporting a plurality of posts, and the posts arranged and disposed to define non-overlapping circumferential patterns. The method also includes wrapping the wire around outer peripheries of the plurality of posts to form non-overlapping wire coils around the plurality of circumferential patterns to provide an antenna. The method further includes securing a second end of the wire to a second portion of the mandrel tool, cutting the wire in proximity to the second end, attaching the antenna to a substrate separate from the faceplate, and detaching the antenna from the faceplate.

20 Claims, 10 Drawing Sheets

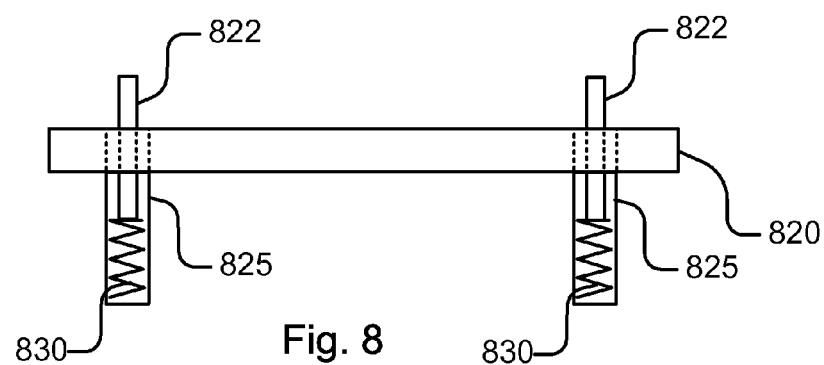
Fig. 8
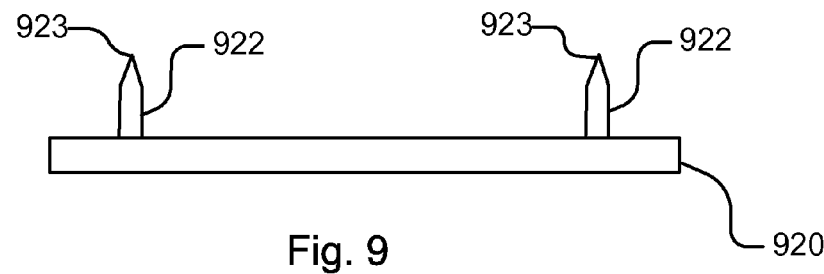
Fig. 9
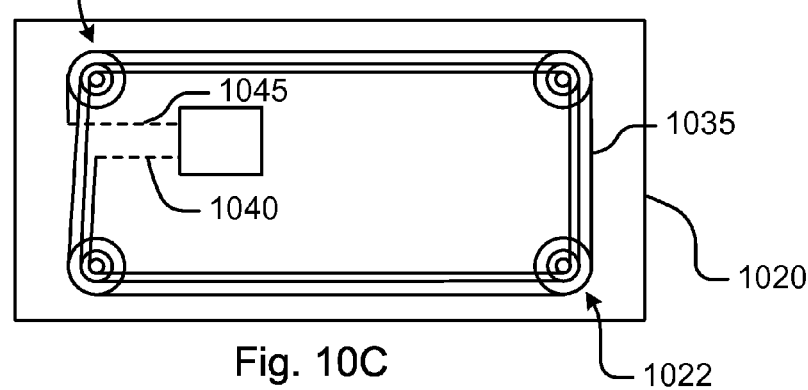
Fig. 10A
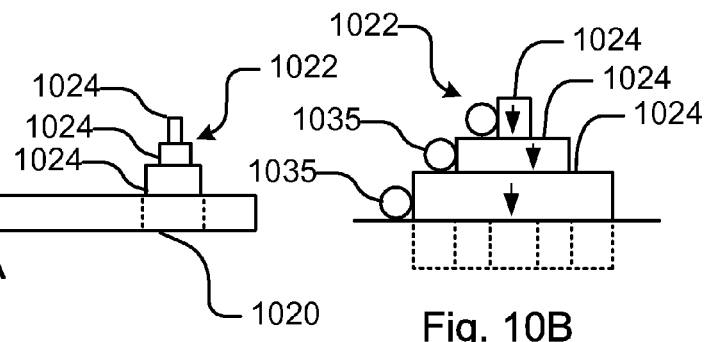
Fig. 10B
Fig. 10C

VARIABLE PITCH MANDREL WOUND ANTENNAS AND SYSTEMS AND METHODS OF MAKING SAME

This application claims priority to U.S. Provisional Patent Application No. 61/262,836, filed on Nov. 19, 2009, entitled "VARIABLE PITCH MANDREL WOUND ANTENNAS", which is hereby expressly incorporated by reference in its entirety for all purposes.

BACKGROUND

Coil antennas are used to receive signals at a resonant frequency of a carrier signal. Some coil antennas are tuned to provide a mutual inductance that results in the antenna being excited by the resonant frequency. Some coil antennas are so-called mandrel wound antennas. Mandrel wound antennas are typically manufactured by winding the coils of the antenna on top of each other. Since the relative spacing of the coils in this type of mandrel wound antenna is unpredictable, the mutual inductance of these mandrel wound antennas is unpredictable. These types of mandrel wound antennas are tuned by adjusting the length of the wire while fabricating the antenna.

In contrast to the unpredictable nature of normal mandrel wound antennas, variable pitch antennas are designed with a precise spacing between the coils of the antenna that allow for fine tuning of the mutual inductance between antenna coils. By adjusting the pitch, overall antenna area can be maximized while maintaining the correct total inductance and resonant frequency of the coil.

Coil antennas are commonly used in contactless smart cards. Currently, the majority of variable pitch contactless smart card antennas are manufactured with etched or printed antennas. Etching and printing processes are expensive and entail the use of various materials that are environmentally unfriendly. These disadvantages are addressed by coil antennas manufactured in accordance with the systems and methods described herein.

Some variable pitch smart card antennas using round wire employ ultrasonics to embed the wire into the plastic substrate. These ultrasonic generators are expensive, as are the horns required to transmit the ultrasonic energy into the wire and plastic. In addition, the horns wear down over time and need maintenance or replacement. Further, the ultrasonic embedding process is time consuming and can only be performed on a limited number of plastic materials.

SUMMARY

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Embodiments as described herein enable the manufacture of coiled wire antennas for contactless smart cards with variable pitch between antenna coils utilizing a mandrel.

In one embodiment, a mandrel tool includes spring-loaded pogo pins set to a desired pitch. A wiring head wraps an antenna wire around these pogo pins to form a complete coil antenna. The tool can be heated so that the antenna could be hot-stamped into a plastic substrate. The tool can be designed so that the pogo pins can be positioned along a track, allowing for a tunable pitch.

Systems and methods in accordance with the disclosure in various embodiments can provide the following capabilities:
  variable pitch coiled wire antenna to allow for tuning of mutual inductance;
  hot stamp tool to simultaneously implant multiple antennas into a plastic substrate;
  inexpensive antenna material;
  inexpensive tooling;
  low maintenance;
  faster production times compared to ultrasonic embedded antennas; and/or
  wider range of plastic substrates compared to ultrasonic embedded antennas (e.g., polyvinyl chloride (PVC), polyethylene terephthalate (PET), Polycarbonate (PC), Teslin™ and others).

In one embodiment, a method of fabricating a mandrel wound antenna includes securing a first end of a wire to a first portion of a mandrel tool, where the mandrel tool includes a faceplate supporting a plurality of posts, and the posts arranged and disposed to define a plurality of non-overlapping circumferential patterns. The method also includes wrapping the wire around outer peripheries of the plurality of posts to form a plurality of non-overlapping wire coils around the plurality of circumferential patterns to provide an antenna, securing a second end of the wire to a second portion of the mandrel tool, cutting the wire in proximity to the second end, attaching the antenna to a substrate separate from the faceplate, and detaching the antenna from the faceplate.

In another embodiment, a mandrel tool system for fabricating a mandrel wound antenna is disclosed. The mandrel tool system includes a first substrate configured to support a plurality of posts arranged and disposed to define a plurality of non-overlapping circumferential patterns. The system further includes a wiring head configured to receive a wire and dispense the wire, and a manipulation subsystem coupled to at least one of the first substrate or the wiring head. The manipulation subsystem is configured to move the first substrate and/or the wiring head relative to each other to wrap the wire being dispensed by the wiring head around outer peripheries of the plurality of posts to form a plurality of non-overlapping wire coils corresponding to the circumferential patterns to provide an antenna. A first end of the wire is secured at a first portion of the first substrate, and a second end of the wire being secured to a second portion of the first substrate. The system further includes a wire cutter configured to cut the wire in proximity to the second end. The first substrate is configured such that the antenna is detachable from the first substrate and the antenna is configured to be attached to a second substrate.

In yet another embodiment, a mandrel wound antenna is provided. The mandrel wound antenna includes a single piece of wire including a first end and a second end and a length of wire between the first end and the second end. The single piece of wire is shaped and disposed to define an antenna including a plurality of non-overlapping circumferential wire coils including at least a first wire coil and a second wire coil. Each of the circumferential wire coils includes at least three corners including first, second and third corners, and a plurality of intra-coil edges between adjacent ones of the corners of the corresponding circumferential wire coil. Each of the plurality of circumferential wire coils, except an outer-most circumferential wire coil, includes an inter-coil edge between one of the corners of an inner one of the circumferential wire coils and one of the corners of an outer one of the circumferential coils. The inter-coil and intra-coil edges are all substantially straight. Pitch distances between the intra-coil and the inter coil edges, the length of the wire, and an area of the outer-most circumferential wire coil are sized and disposed to provide determinable mutual inductances between the plurality of circumferential wire coils, and the determinable mutual inductances combine to provide a total inductance that, when coupled to a chip with a known chip capacitance, results in the antenna providing a desired resonant frequency. The mandrel wound antenna further includes a polymer layer coating the plurality of circumferential wire coils to physically couple the plurality of circumferential wire coils to maintain the pitch distances prior to the antenna being attached to a substrate.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 8 is a side view of a faceplate with spring loaded pogo-pins used as posts.

FIG. 9 is a side view of a faceplate with sharp pins for piercing a substrate sheet.

FIGS. 10A, 10B and 10C are a side view, an exploded side view and a plan view of a configuration of a faceplate with telescoping posts for wrapping a mandrel wound antenna.

DESCRIPTION

Systems and methods of making variable pitch mandrel wound antennas are provided. Methods in accordance with the disclosure include wrapping a conductive wire around posts protruding above a surface of a first substrate, e.g., a faceplate (hereinafter "faceplate"), to form a plurality of antenna coils. The posts are disposed on the faceplate with predetermined spacing, i.e., pitch, between the posts in order to provide a predictable mutual inductance between the coils of the antenna. After completing the wrapping of the antenna, the antenna is attached to a second substrate, e.g., a plastic or paper substrate (hereinafter "substrate"), by pressing the faceplate and antenna coils onto the substrate. The attaching can include embedding the antenna after heating the faceplate. The resulting antenna has a predictable inductance and capacitance and does not require tuning as with normal mandrel wound antennas.

Figure 1:
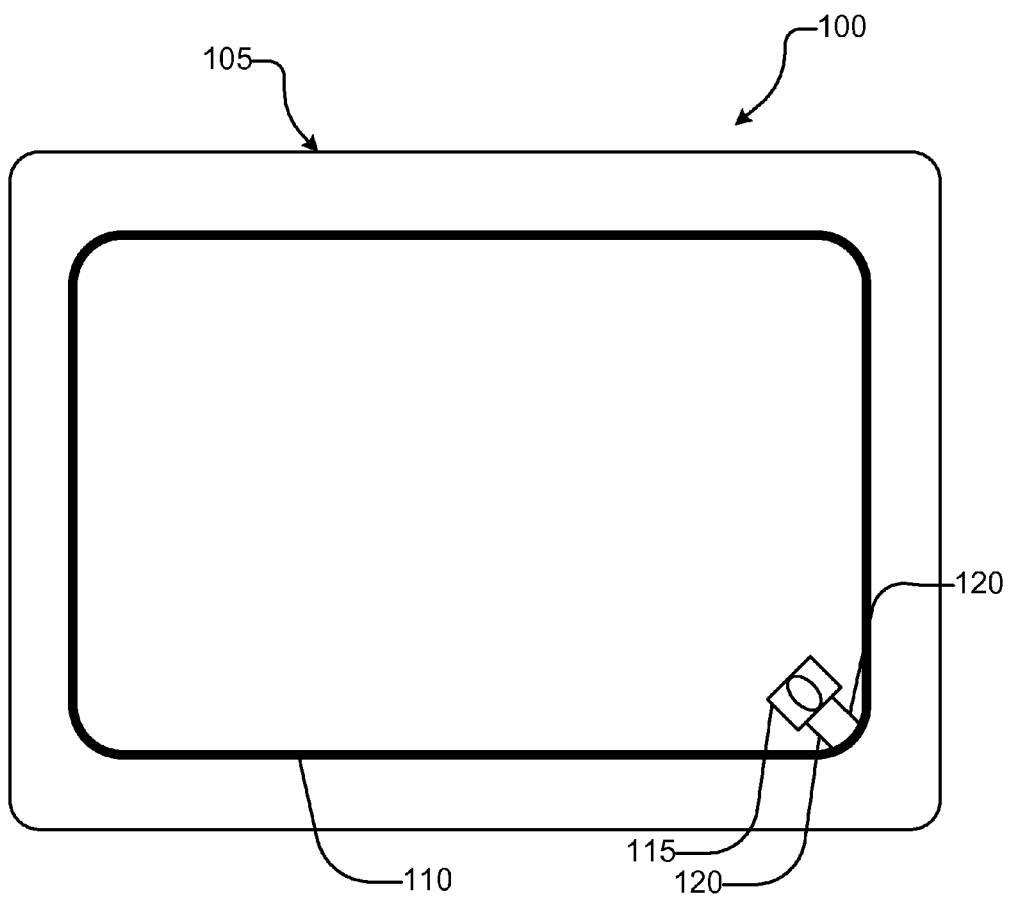
FIG. 1 is a plan view of a smart card.

Referring first to FIG. 1, a plan view of a smart card 100 is shown. The smart card 100 includes a body 105, a coiled antenna 110 and a chip 115. The body 105 is formed of multiple layers which can include two plastic outer layers, and one or more intermediate circuitry layers. The outer layers can be made of plastic or other insulating material. The one or more circuitry layers can include the antenna 110, the chip 115 and connections 120 connecting the chip to the antenna 110 and/or other circuitry.

The antenna 110 is a mandrel wound antenna including multiple coils (not shown). Normal mandrel-wound antennas utilize fixed corner posts (not shown) that the antenna wire is wrapped around using a wiring head. The coils of the normal mandrel antenna are wrapped onto themselves multiple times. Because the coils of the antenna are in contact with each other, inductance of the entire antenna is affected. The total inductance of the normal mandrel wrapped antenna is unpredictable because of the unpredictable spacing of the coils. Tuning of a normal mandrel antenna to the capacitance of the chip 115 is accomplished by adjusting the length of the antenna wire, and hence changing the area of the antenna, to match a desired resonant frequency. Antennas are completed by joining the coils typically with polyimide.

Figure 2:
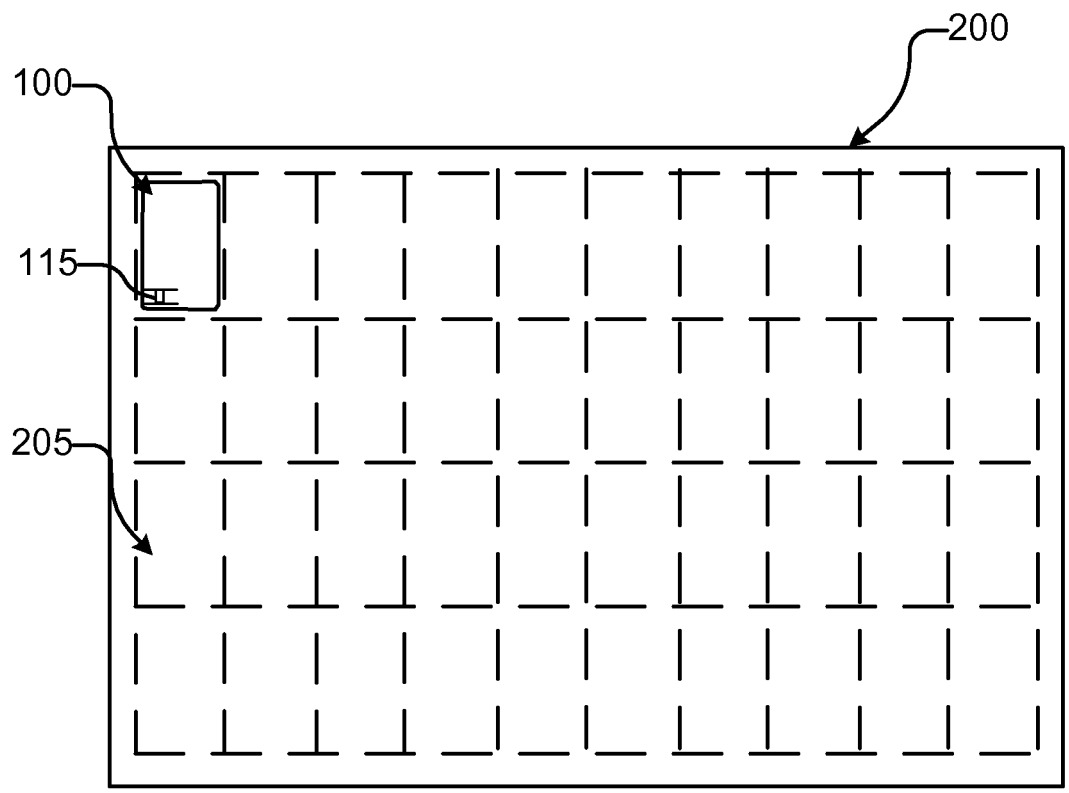
FIG. 2 is a plan view of a substrate sheet used in manufacture of smart cards such as the smart card of FIG. 1.

Referring to FIG. 2, a plan view of a substrate sheet 200 used in manufacture of smart cards is shown. The sheet 200 is made of plastic, paper or some other type of flexible, insulating material. The sheet 200 is divided into sections 205 within which smart cards 100 are formed. In this embodiment there are four rows and ten columns of sections 205. Other embodiments can have fewer or more rows and/or columns of sections 205. One of the antennas 110 is attached to the sheet 200 within each of the sections 205. The antenna 110 can be attached using an adhesive or by some other method. One of the chips 115 is also attached to the sheet 200. The two ends of the antenna wire are electrically connected to terminals of the chip 115.

An alternative to tuning coil antennas by adjusting the length of the antenna wire is to manufacture the antennas with a mandrel tool having precisely spaced posts which the antenna wire is wrapped around using a wiring head. The mandrel tool includes a faceplate that includes the posts. The wiring head is integrated with the mandrel tool such that the faceplate is moved relative to the wiring head, or vice-versa, thereby wrapping the antenna wire around the posts.

Figure 3A:
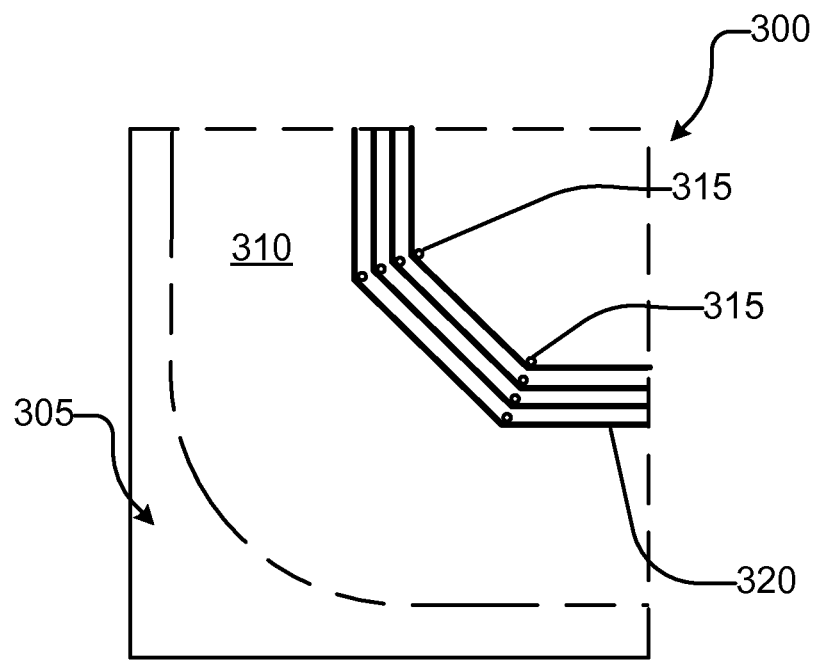
FIGS. 3A and 3B are exploded plan views of a corner portion of a faceplate of a mandrel tool used to make a variable pitch antenna for the smart card of FIG. 1.
Figure 3B:
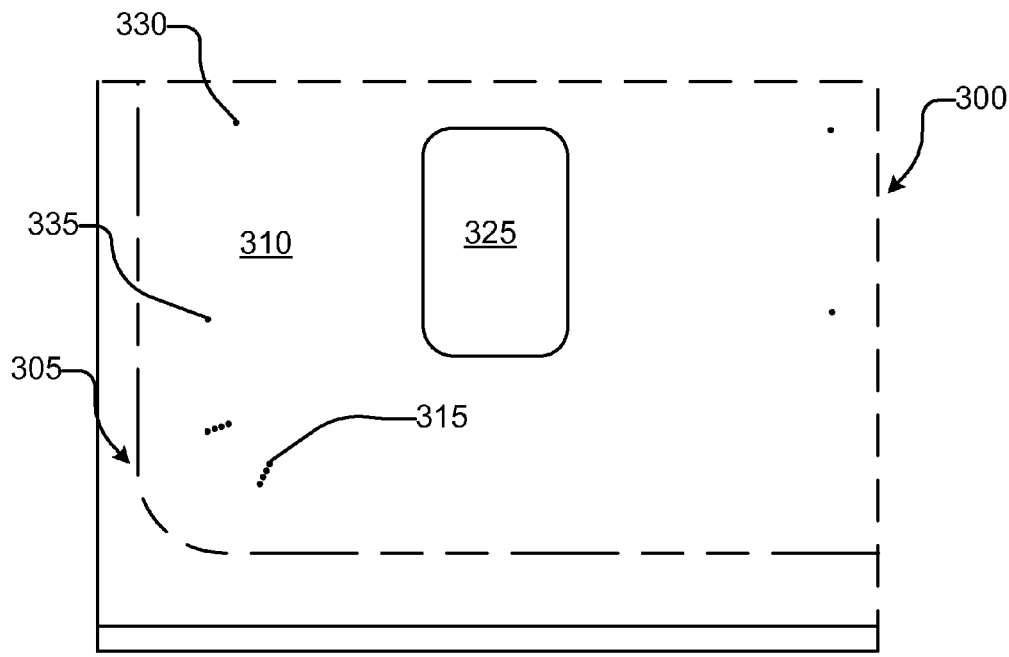

Referring to FIGS. 3A and 3B, exploded plan views of a corner portion of a faceplate 300 of a mandrel tool are shown. The faceplate 300 includes a front surface 305 that includes a center portion 310. The center portion 310 can be a raised portion in the shape of a smart card. Having the center portion 310 raised allows the center portion to press against the sheet 200 to attach the antenna 110 to the sheet 200. In one embodiment, the faceplate 300 is heated and the raised portion 310 presses the antenna 110 into the sheet 200.

The faceplate 300 also includes posts 315. In the embodiment shown, there are four pairs of posts 315 in each of the four corners of the faceplate 300. The spacing between the posts 315 are sized to provide the desired inductance and antenna area for the antenna 110. In some configurations, the faceplate 300 includes tracks such that the posts 315 can be moved along the tracks, allowing for a tunable pitch.

An antenna wire 320 is wrapped around the posts 315, thereby forming four coils displaced from each other at predetermined, and predictable distances. The antenna wire 320 can be wrapped around the post by clamping a first end of the antenna wire 320 to the faceplate 310 at a first point 330, moving the faceplate 300 laterally relative to the wiring head, or vice-versa, such that the antenna wire 320 wraps around a different pair of the posts 315 on each rotation of the faceplate 300. After the last coil of the antenna wire 320 has been wrapped, a second end of the antenna wire 320 is clamped to the faceplate 310 at a second point 335. After clamping the second end of the antenna wire 320, the antenna wire 320 is cut. As an alternative to clamping the first and second ends of the antenna wire 320 to the faceplate 310, the ends can be looped around a first post 315 and a last post 315.

As shown in FIG. 3B, the faceplate 300 includes a chip area 325. The chip area 325 can be an indented area such that a chip 115 that is already attached to the sheet 200 will be accepted into the chip area 325. In this way, the chip 115 will not be pushed against when the faceplate 300 is pressed against the sheet 200 while attaching the antenna 110. In addition, the faceplate 300 could include indented portions where the ends of the antenna wire 320 are received, thereby preventing the ends from being embedded in the sheet 200. In another configuration, the chip area 325 is configured to hold the chip 115. In this configuration, the two ends of the antenna 110 could be coupled (e.g., welded or soldered) to the chip 115 and then the antenna 110 and chip 115 could be attached to the sheet 200. In embodiments where the faceplate 300 is heated, the chip area 325 could be thermally insulated from the heated antenna portion of the faceplate such that the chip 115 is not damaged.

Figure 4:
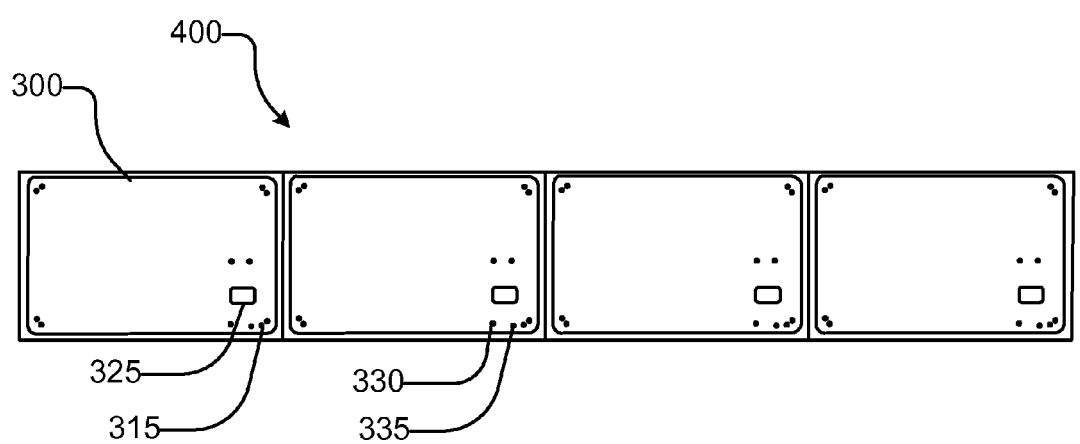
FIG. 4 is a plan view of a quadruple (a.k.a. 4-up) faceplate used to manufacture smart cards on the substrate sheet of FIG. 2.

Referring to FIG. 4, a plan view of a quadruple (a.k.a. 4-up) faceplate 400 is shown. The 4-up faceplate 400 includes four of the faceplates 300. The wiring head wraps the antenna wire 320 around each of the faceplates 300 using the procedure described above in reference to FIGS. 3A and 3B. After the antenna wire 320 is wrapped around the posts 315 of all four faceplates 300, the 4-up faceplate 400 is pressed against one of the rows of sections 205 to attach the antennas 110 (and the chip 115 in some embodiments) to the sheet 200. This process is repeated until antennas 110 (and possibly chips 115) are attached to all of the sections 205 of the sheet 200.

The sheet 200 can be pre-processed in different ways prior to attaching the antennas 110. Holes can be formed in the sheet 200. The holes can be for attaching circuitry, in a later processing step, to the antenna 110. The antenna 110 can be positioned over the holes such that the circuitry can be coupled to the antenna 110. The holes can also be positioned to be in the chip area 325 such that the chip 115 contacts coincide with the holes. The chip 115 can be inserted into the holes prior to attaching the antenna 110, during the attaching of the antenna 110, or after the attaching of the antenna 110, depending on the configuration. The chip 115 could be on a separate sheet that is then attached to the sheet 200.

In embodiments where the 4-up faceplate 400 is heated and the antenna 110 is hot-pressed into the sheet 200, the antenna 110 is embedded into the sheet 200. This can reduce the thickness of the completed smart card. Instead of heating the tool for hot-pressing into plastic, the entire tool could be tuned to an ultrasonic generator to allow for ultrasonic implanting.

As an alternative to pressing the antenna 110 to the sheet 200, the antenna 110 can be sprayed with a polymer to form a rigid (or semi-rigid) structure and then the antenna can be placed on the sheet 200 for attachment. For example, the antenna 110 coil could be coated with polyimide or other plasticizer to retain the pitch and form of the antenna and the antenna 110 could then be transferred or glued to the substrate in a later processing step.

After the antennas 110 are attached to the sheet 200, an encapsulating sheet is attached to the antennas 110 and the sheet 200 to encapsulate the antennas 110 between the sheet 200 and the encapsulating sheet. Another encapsulating sheet can be attached on the opposite side of the sheet 200 to insulate any circuitry and chip connections that protrude through the sheet 200. The entire encapsulated assembly can then be laminated to further strengthen the smart cards 100.

The precise spacing of the posts 315 allows precise controllability of the distances between the coils. The posts can be located at positions of the faceplate 300 that provide for a maximum outer dimension, providing a maximum antenna area, thereby providing an increased range at which the antenna can be powered by the power signal of a card reader. The positions of the posts 315 will vary depending on the capacitance of the chip 115 and the desired resonant frequency. In some embodiments, the faceplate 300 includes tracks such that the posts 315 can be moved along the tracks, allowing for a tunable pitch.

Figure 5:
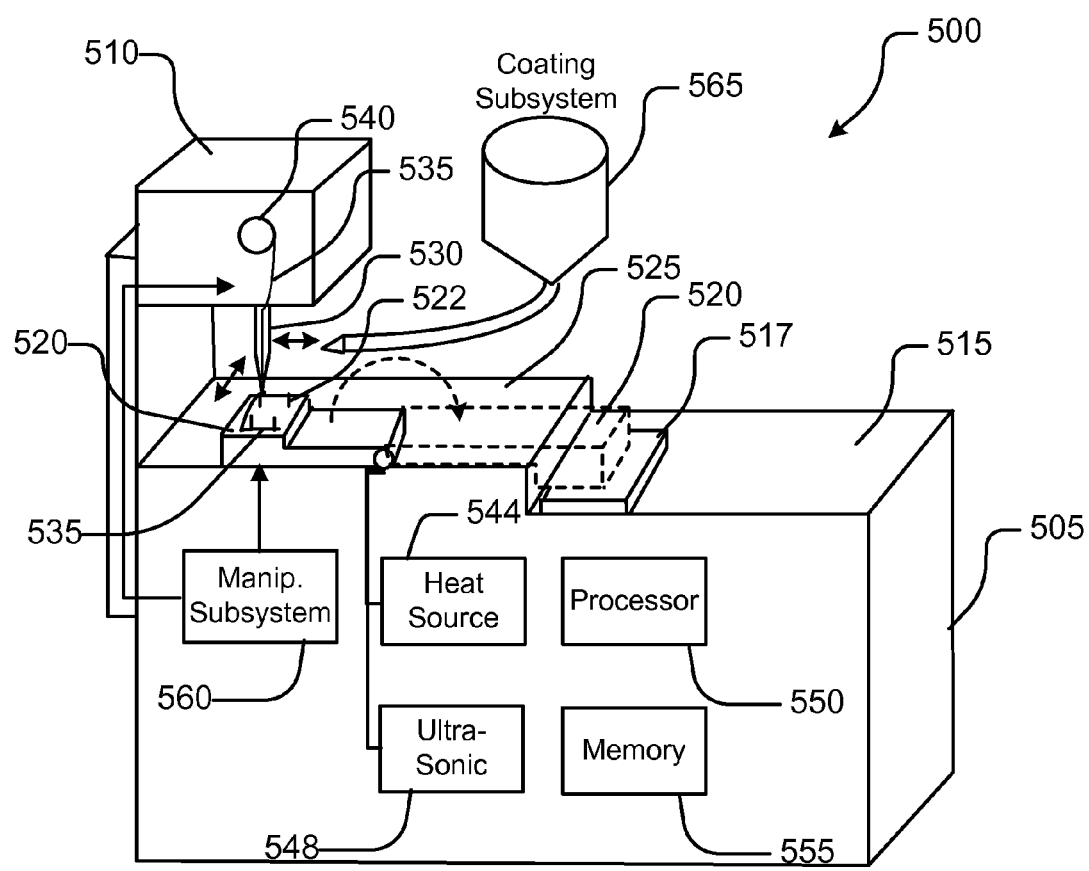
FIG. 5 is a perspective view of a mandrel tool system for fabricating mandrel wound antennas.

Referring to FIG. 5, a perspective view of a mandrel tool system 500 for fabricating mandrel wound antennas is shown. The mandrel tool system 500 includes a main housing 505 and a wiring housing 510. The main housing 505 houses a processing system, illustrated by functional blocks. The processing system is used to control the mechanical operation of the mandrel tool system 500. The processing system includes a processor 550, memory 555 a manipulation subsystem 560 and one or more of a heat source 544 and/or an ultrasonic generator 548. The processor 550 is a programmable device, e.g., a central processing unit (CPU), such as those made by Intel® Corporation or AMD®, a microcontroller, an application specific integrated circuit (ASIC), a field programmable gate array (FPGA), and/or logic gates etc. The memory 555 includes random access memory (RAM) and/or read-only memory (ROM). The memory 555 stores a computer program product comprising computer-readable, computer-executable software code containing instructions that are configured to, when executed, cause the processor 550 and/or other subsystems to perform various functions described herein. Alternatively, the software may not be directly executable by the processor 550 but configured to cause the processor 550, e.g., when the instructions are compiled and executed, to perform the functions described.

The main housing 505 includes a substrate surface 515 configured to support a substrate sheet 517 upon which mandrel wound antennas will be attached to the substrate 517 (e.g., to form smart cards). The substrate 517 can be a plastic, e.g., polyvinyl chloride (PVC), polyethylene terephthalate (PET), Polycarbonate (PC), Teslin™, or paper. A faceplate 520 is rotatably coupled to a winding platform 525. The faceplate 520 of this configuration includes posts 522 to form a single mandrel wound antenna. Other configurations can include a faceplate with multiple sets of posts 522 for forming multiple antennas (e.g., a 4-up faceplate as shown in FIG. 4).

Figure 6:
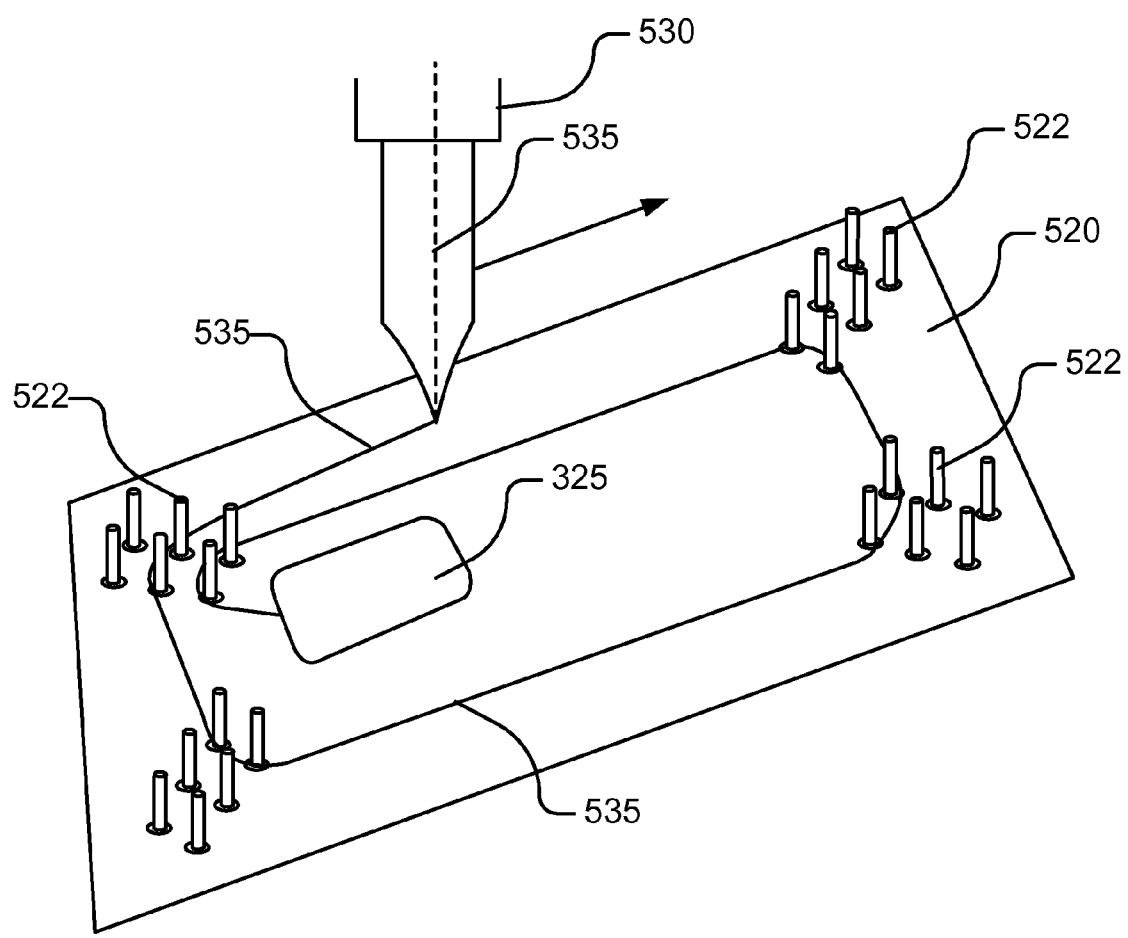
FIG. 6 is an exploded perspective view of a wiring head wrapping an antenna wire around posts of a faceplate of the mandrel tool system of FIG. 5.

A wiring head 530 is mechanically coupled to actuation motors (not shown) housed in the wiring housing 510. FIG. 6 shows an exploded perspective view of the wiring head 530 in the process of wrapping an antenna wire 535 around the posts 522 of the faceplate 520. The actuation motors move the wiring head 530 precisely around the posts 522 to wrap the antenna wire 535 around the posts 522 to form a mandrel wound antenna. The actuation motors are controlled by the manipulation subsystem 560. The manipulation subsystem is controlled by the processor 550 and/or parameters stored in the memory 555. The actuation motors and manipulation subsystem 560 are similar in design and function to a high precision robot such as, for example, a pick-and-place robot used to populate printed circuit boards.

In one configuration, the posts 522 are configured to be raised and lowered relative to the faceplate 520 during the wrapping process. The manipulation subsystem 560 controls the position of the posts during the wrapping process. The wrapping can start with all the posts in the lowered position. The manipulation subsystem 560 raises the inner most posts first and raises the outer posts as the wiring head 530 wraps the outer coils. The posts 522 can be raised by pushing them up through the faceplate 520. Alternatively, the posts 522 can be rotatable and rotated from being parallel with the faceplate 520 to being perpendicular to the faceplate 520.

The antenna wire 535 can be copper, aluminum or other suitable conductive metal. The antenna wire 535 is typically insulated, but non-insulated wire can be used in some configurations as discussed below. The antenna wire 535 is supplied from a wire source 540 housed in the wiring housing 510. The wiring head 530 can include a wire cutter (not shown) for cutting the antenna wire 535. The faceplate 520 includes means for clamping the antenna wire 535 to the faceplate 520. After the antenna wire 535 has been wrapped around all the posts 522 and cut, the rotatable faceplate 520 is rotated, as indicated by the dashed arrow and the dashed faceplate 520, to press the faceplate 520 and the antenna wire 535 against the substrate sheet 517 and thereby attach the mandrel wound antenna to the substrate 517.

The heat source 544 is thermally coupled to the faceplate 520. The heat source 544 can be an electrical coil, a hot water or steam source or other heat source. The heat source heats the faceplate and the wrapped antenna wire 535 to a temperature sufficient to soften the plastic substrate 517 and embed the antenna into the substrate 517 when the faceplate 520 is pressed against the substrate 517. In an alternative configuration, an ultrasonic generator 548 is tuned and coupled to the faceplate 520. The ultrasonic generator 548 can be an ultrasonic horn. The ultrasonic generator vibrates the faceplate 520 and the antenna wire 535 such that the plastic substrate is heated to a temperature such that the antenna wire 535 is embedded in the substrate 517 upon being pressed by the faceplate 520.

Yet another alternative for attaching the antenna to the substrate includes a coating system 565. The coating system 565 applies an adhesive to the antenna wire 535. The adhesive can be a glue, a tape or other type of adhesive. After application of the adhesive, the faceplate 520 rotates and presses the antenna wire against the substrate 517 to attach the antenna to the substrate 517. Alternatively, the coating system 565 can apply a polymer, such as polyimide, for example, to the antenna wire 535 to coat the wrapped antenna to be semi-rigid. After the polymer has hardened, the antenna can be attached to the substrate 517. The antenna can be attached by hand or using the faceplate 520, in conjunction with an adhesive, to attach the antenna to the substrate 517. Adhesives and polymers can be used with paper substrates 517, e.g., for limited use (LU) smart cards, as well as with plastic substrates 517. For LU cards, the substrate 517 can be an adhesive backed paper or thin plastic which can include heat activated adhesive or press activated adhesive. The antenna wire 535 of an LU card could be made of aluminum or aluminum alloy to further reduce the cost.

Figure 7:
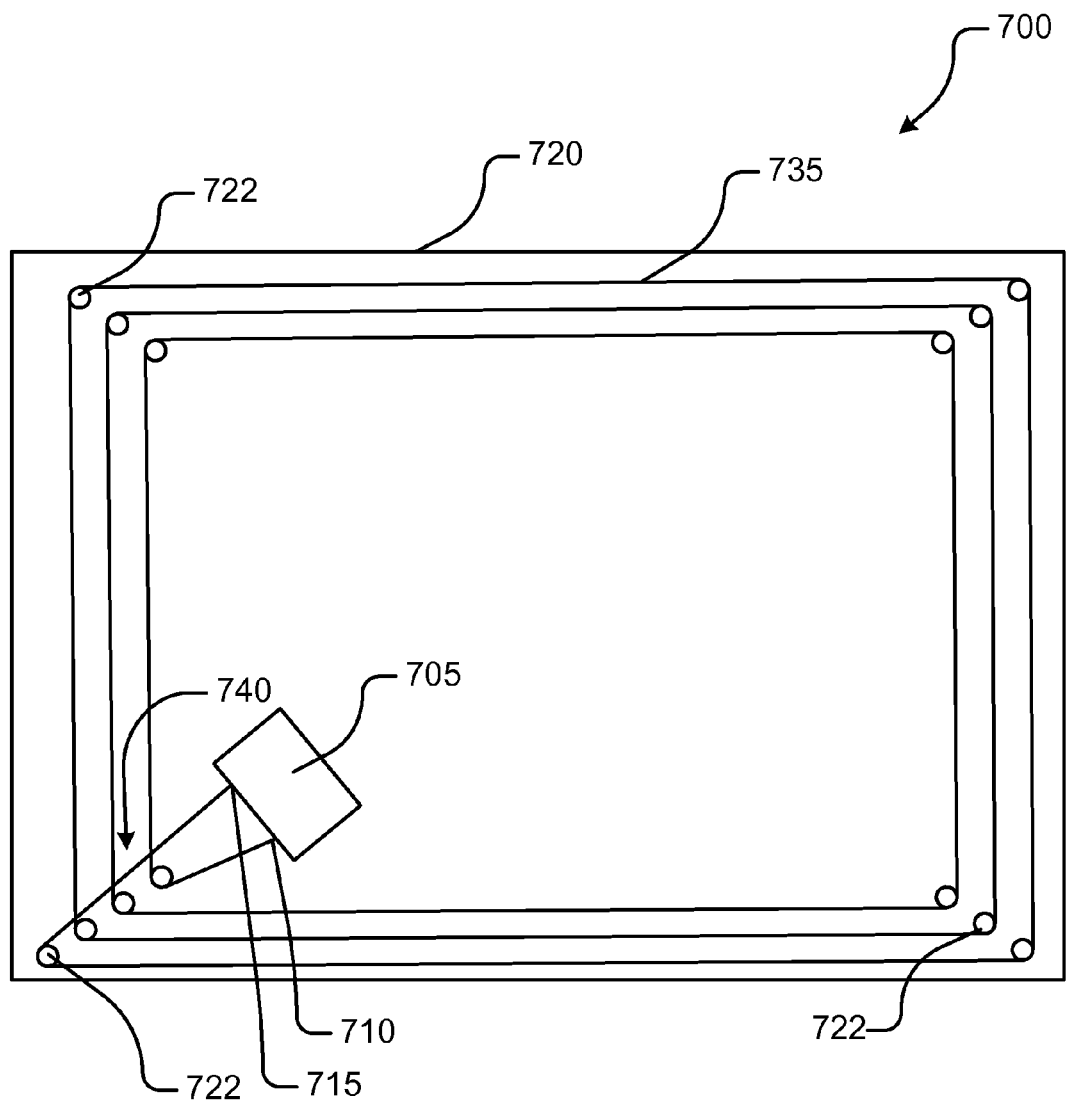
FIG. 7 is a plan view of a configuration of a faceplate with a variable pitch mandrel wound antenna attached to a smart card chip on the faceplate.

Alternative designs for faceplates, such as the faceplates 300, 400 and 520 discussed above, will now be discussed. Referring to FIG. 7, a plan view of a configuration of a faceplate 700 includes a variable pitch mandrel wound antenna attached to a smart card chip 705 on the faceplate 720. The chip 705 is positioned in a recess area such as the chip area 325 illustrated in FIGS. 3 and 6. A first end of an antenna wire 735 is attached to the chip 705 at a first connection point 710 and a second end of the antenna wire 735 is attached to the chip 705 at a second connection point 715. The antenna wire is wrapped around posts 722. The faceplate 700 includes three posts 722 in three corners and four posts 722 in the fourth corner nearest the chip 705. The antenna wire 735 can be welded to the chip 705 using, for example, compression welding. The antenna wire 735 can be insulated or not insulated. When the antenna wire 735 is insulated, the compression welding blows of the insulation such that the antenna wire 735 is coupled to the first and second connection points 710 and 715. When the antenna wire 735 is not insulated, an insulation layer or bridge, e.g., mylar, can be applied in a cross-over area 740 such that the second end of the antenna wire 735 does not short circuit with the antenna wire 735 in the three coils.

The posts 522 and 722 of the faceplates 520 and 720 can take on several configurations. In a first configuration, the posts are fixed posts attached to the faceplate. In this configuration, the substrate 517 can include holes where the posts are located. In this way, the posts can protrude through the holes of the substrate when the antenna and/or chip are being attached to the substrate.

Referring to FIG. 8, a second faceplate 820 configuration includes posts 822 that are spring-loaded and referred to as pogo-pins 822. The pogo-pins 822 are contained in cylinders 825. The cylinders 825 house a lower portion of the pogo-pins and a spring 830. The springs 830 are pre-loaded such that the pogo-pins 322 protrude out of the faceplate 820. When the faceplate 820 is pressed against a substrate, to attach an antenna to the substrate, the springs 825 are compressed allowing the antenna wire (not shown) to be pressed against the substrate.

Referring to FIG. 9, a third faceplate 920 configuration includes posts 922 that have sharp pointed ends 923 and are referred to as pins 922. The pointed ends 923 are configured to pierce the substrate 517 when the faceplate 920 presses against the substrate 517. In this way, the substrate 517 does not have to provide holes for fixed posts to pass through.

Referring to FIGS. 10A, 10B and 10C, a fourth faceplate 1020 configuration includes telescoping posts 1022. The telescoping posts 1022 comprise three stepped rings 1024 that are configured to collapse within themselves, as illustrated by the arrows in FIG. 10B, when the faceplate 1020 is pressed against the substrate. When the stepped rings 1024 collapse, antenna wire 1035 can be attached, e.g., by being embedded, to the substrate. As shown in FIGS. 10B and 10C, the antenna wire 1035 is wrapped around a different ring 1024 of the telescoping posts 1022 to form the three coils, in this configuration, of the mandrel wound antenna. In this configuration, a chip recess 1025 is provided in the faceplate 1020. Connection wires 1040 and 1045 connecting first and second ends of the antenna wire 1035 to the chip recess 1025, can optionally be attached to the faceplate 1020. Alternatively, the connection wires 1040 and 1045 can be attached to the antenna wire 1035 after the antenna has been attached to the substrate 517.

Figure 11A:
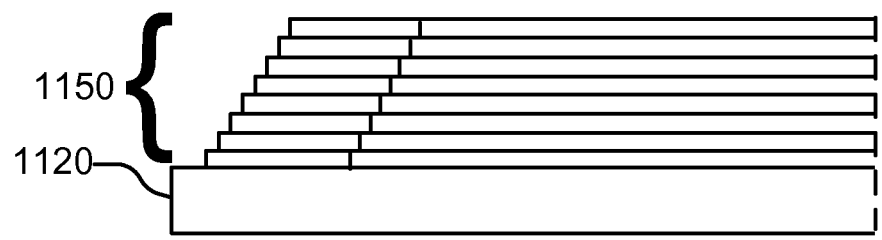
FIGS. 11A and 11B are an exploded side view and exploded plan view of a telescoping faceplate.
Figure 11B:
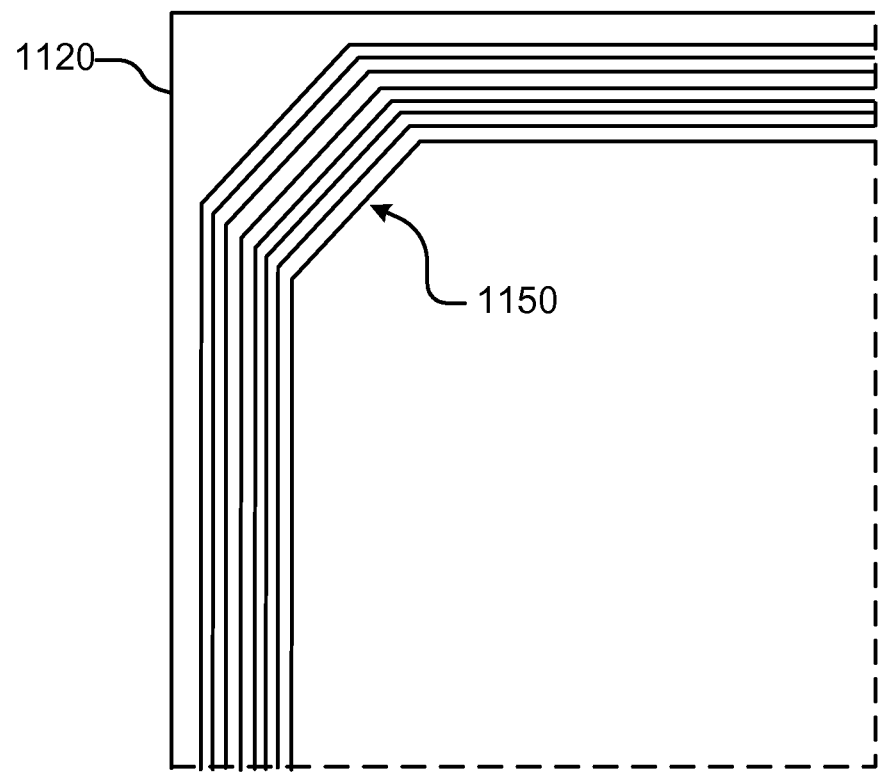

Referring to FIGS. 11A and 11B, a fifth faceplate 1120 configuration includes telescoping layers 1150 instead of posts. The telescoping layers 1150, which are only partially shown in FIGS. 11A and 11B, are shaped to the desired shape of the antenna coils. An antenna wire, not shown, is wrapped around successive layers 1150 to form the coils of the mandrel wound antenna. When the faceplate 1120 is pressed against the substrate 517, to attach the antenna, the telescoping layers collapse within each other such that the antenna is pressed against and embedded in the substrate 517.

Figure 12:
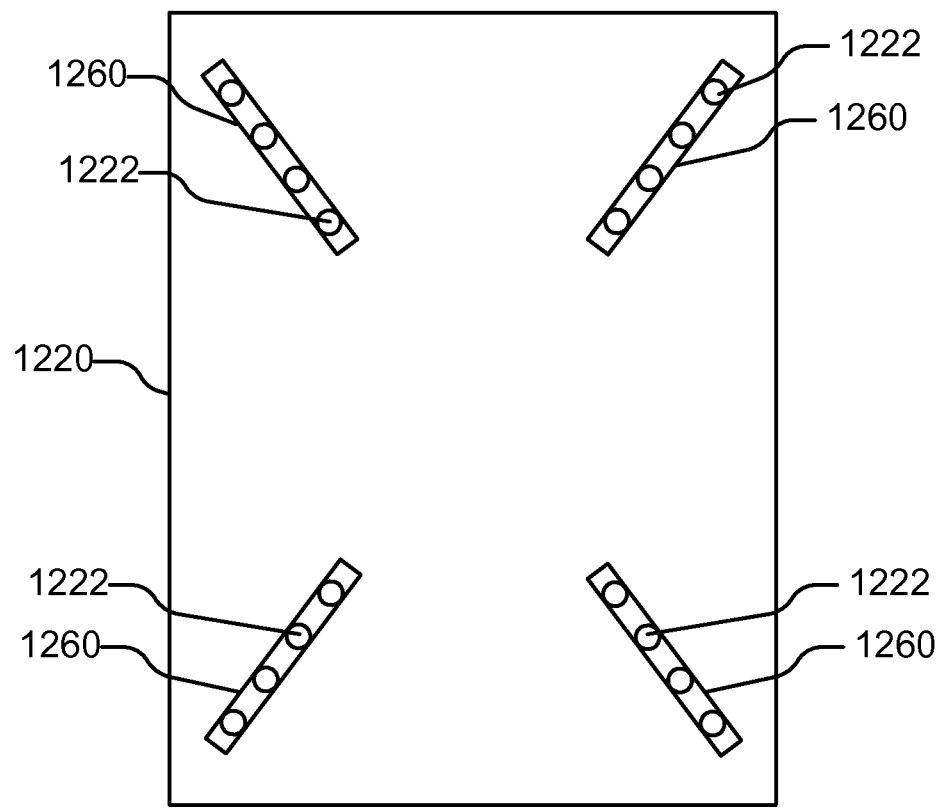
FIG. 12 is a plan view of a faceplate with tracked pins for adjusting the pitch of the pins.

Referring to FIG. 12, a sixth faceplate 1220 configuration includes posts 1222 movably coupled to the faceplate 1220 via tracks 1260. The pitch distances between the posts 1222 can be varied in order to fabricate antennas with different inductances using the same faceplate 1220. In one configuration, the posts 1222 can be press fit into the track 1260, e.g., using a pick and place robot. In another configuration, the posts 1222 can be positioned by actuators that are coupled to bottom portions of the posts 1222 (bottom portions not shown). The manipulation subsystem can be configured to move the posts 1222 while the antenna wire 5343 is being wrapped, prior to cutting the wire. The manipulation subsystem 560 could also be configured to position the posts 1222 to achieve a desired mutual inductance for different diameter antenna wire 535. The manipulation subsystem 560 could also be configured to position the posts 1222 for different wire types (e.g., changing from copper to aluminum).

Figure 13:
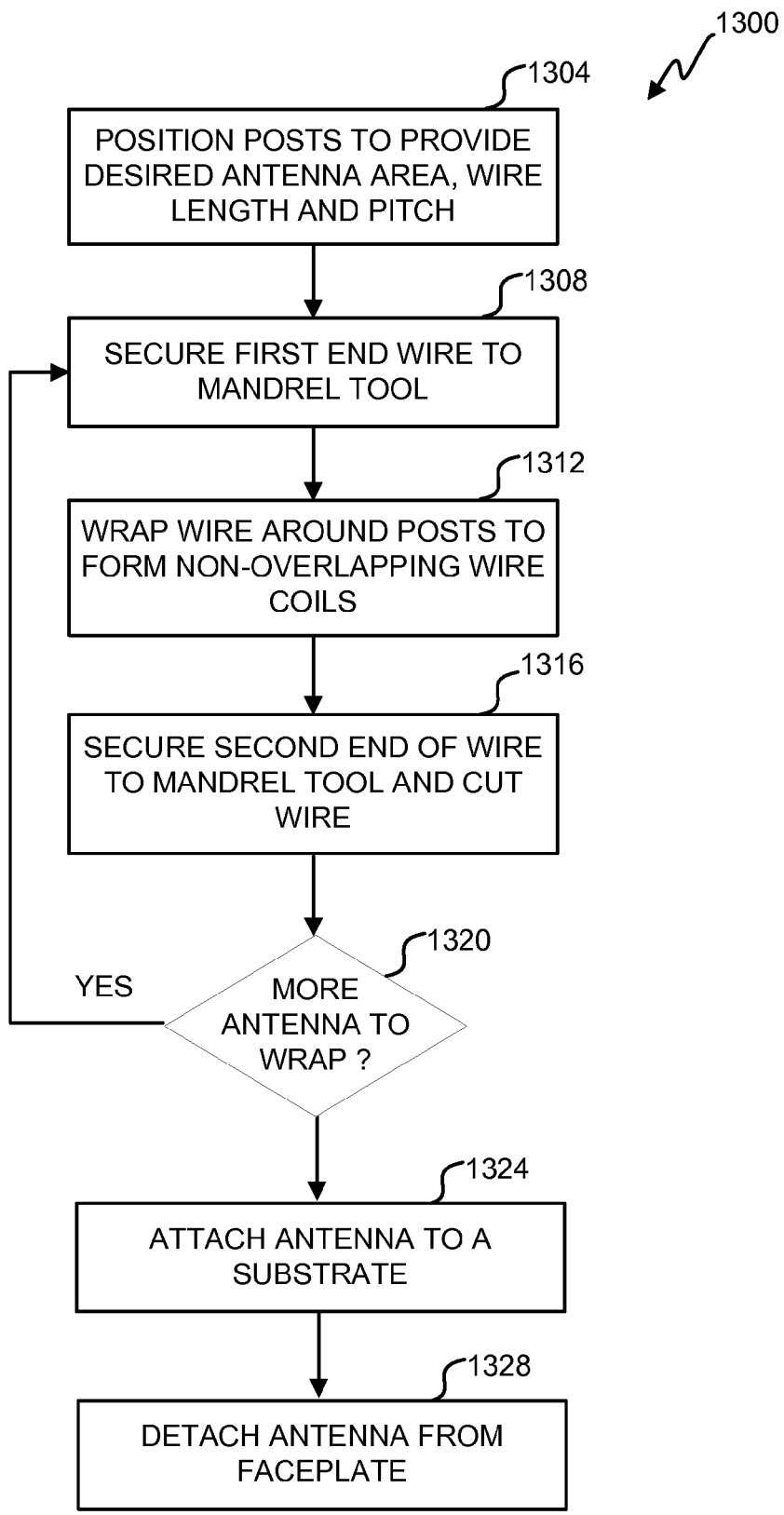
FIG. 13 is a flowchart of a process for manufacturing a mandrel wound antenna.

Referring to FIG. 13, a process 1300 of fabricating a mandrel wound antenna includes the stages shown. The process 1300 is exemplary only and not limiting. The process 1300 may be modified, e.g., by adding, removing, or rearranging the stages shown. With further reference to FIG. 5, the process 1300 begins at optional stage 1304 where a plurality of posts 522 are positioned on the faceplate 520. The stage 1304 is omitted if the posts 522 are located at fixed positions on the faceplate 520. When the faceplate 520 includes posts 522 that are adjustable in pitch, the posts 522 are positioned to provide a desired antenna area, a desired total antenna wire length and a desired pitch between a plurality of coils of the antenna such that the mutual inductance of the antenna is a desired value. The adjustable posts 522 can be positioned by a pick-and-place robot. The posts, adjustable or non-adjustable, are arranged and disposed to define a plurality of non-overlapping circumferential patterns.

At stage 1308, the mandrel tool system 500 secures a first end of the antenna wire 535 to a first point of the faceplate 520. The antenna wire can be clamped to the first point with a clamp mechanism. Upon securing the first end of the antenna wire 535 to the faceplate 520, the process 1300 continues to stage 1312 where the manipulation subsystem 560 moves the wiring head 530 and/or the faceplate 520 relative to each other to wrap the antenna wire 535 around the plurality of posts 522 to form non-overlapping wire coils around the plurality of non-overlapping circumferential post patterns to provide an antenna. At stage 1312, the mandrel tool system 500 secures the second end of the antenna wire 535 to the faceplate 520 at a second point. In one configuration, the first and second points are located on the faceplate at positions away from the chip recess area, e.g., the area 325 in FIGS. 3 and 4. In another configurations, the first and second points are located on a chip contained in the chip recess area, such as illustrated in FIG. 7.

At stage 1316, the wire cutter of the wiring head 530 cuts the antenna wire 535. At stage 1320, the mandrel tool system 500 determines if more antennas remain to be wrapped before attaching the antennas to a substrate. If it is determined at stage 1320 that more antenna need to be wrapped, the process 1300 repeats stages 1308, 1312, 1316 and 1320. For example, with the 4-up faceplate 400 as illustrated in FIG. 4, the stages 1308, 1312, 1316 and 1320 would be repeated four times. If it is determined at stage 1320 that no more antennas are to be wrapped, the process 1300 continues to stage 1324.

At stage 1324, the mandrel tool system 500 attaches the antenna to the substrate 517. The manipulation subsystem 560 controls the faceplate 520 to rotate and press the faceplate 520 and the antenna wire 535 against the substrate 517. The heat source 544 and/or the ultrasonic generator 548 are used to embed the antenna wire 535 into the substrate 517, as discussed above. Alternatively, the coating system 565 applies an adhesive to the antenna wire 535 prior to the faceplate 520 pressing against the substrate 517.

At stage 1328, the faceplate 520 is rotated away from the substrate 517 and the antenna wire 535 remains attached to the substrate 517 and detaches from the faceplate 520. In one configuration, the detaching stage 1328 is performed prior to the attaching stage 1324. In this configuration, the coating subsystem 565 coats the antenna wire 535 with a polymer prior to detaching the antenna wire 535 from the faceplate at stage 1328. The polymer serves to couple the plurality of coils of the antenna to maintain the separation distances provided by the posts. The polymer coated antenna is then detached from the faceplate 520 and attached to the substrate 517 at stage 1324, e.g., using an adhesive.

Subsequent to attaching the antenna at the stage 1328, one or more additional layers can be added. For example, additional layers can include a printed circuit layer, an overlay layer and/or a laminate layer in the case of a long term use card.

Other embodiments are within the scope and spirit of the appended claims. For example, with further reference to FIGS. 5 and 6, the coils of the antenna wire 535 could be stacked vertically. A first set of three coils could be wrapped and the coating subsystem 565 could coat the first set of coils with a mylar layer off a certain thickness. The wiring head 530 could then be controlled by the manipulation subsystem 560 to wrap a second set of coils on top of the first set. The first and second set of coils could be a single antenna. Alternatively, the first and second set of coils could define two separate antennas. While the above description focuses on antennas for smart cads, the systems and methods can also be used to fabricate antennas smart card readers or any other coil-wrapped antenna. The systems and methods could be used to implant a coil antenna such as, for example, a near field communications (NFC) antenna, into a phone housing or a PCB. The faceplate could also include panels (curved or straight), instead of posts, that define the antenna coil patterns.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure. Thus, the disclosure is not limited to the embodiments shown herein but is to be accorded the widest scope consistent with the principles and novel features disclosed herein.

What is claimed is:

1. A method of fabricating a mandrel wound antenna comprising:
   securing a first end of a wire to a first portion of a mandrel tool, the mandrel tool comprising a faceplate supporting a plurality of posts, the posts arranged and disposed to define a plurality of non-overlapping circumferential patterns;
   wrapping the wire around outer peripheries of the plurality of posts to form a plurality of non-overlapping wire coils around the plurality of circumferential patterns to provide an antenna;
   securing a second end of the wire to a second portion of the mandrel tool;
   cutting the wire in proximity to the second end;
   attaching the antenna to a substrate separate from the faceplate; and
   detaching the antenna from the faceplate.

2. The method of fabricating a wound antenna of claim 1, wherein attaching the antenna to the substrate comprises pressing the faceplate and the antenna against the substrate to attach the antenna to the substrate, and detaching the antenna from the faceplate comprises pulling the faceplate away from the substrate to allow the antenna to be separated from the faceplate and the posts subsequent to being attached to the substrate.

3. The method of fabricating a wound antenna of claim 2, further comprising heating the faceplate prior to pressing the faceplate and the antenna against the substrate, wherein the faceplate is heated to a temperature such that pressing the faceplate against the substrate presses the antenna into the substrate.

4. The method of fabricating a wound antenna of claim 2, further comprising applying an adhesive to the antenna prior to pressing the faceplate and the antenna against the substrate, wherein the adhesive causes the antenna to adhere to the substrate while the faceplate is pulling away from the substrate.

5. The method of fabricating a wound antenna of claim 2, wherein the faceplate is coupled and tuned to an ultrasonic generator, the method further comprising ultrasonically vibrating the faceplate with the ultrasonic generator while pressing the faceplate against the substrate and causing the antenna to be at least partially embedded into the substrate.

6. The method of fabricating a wound antenna of claim 2, wherein the faceplate provides a recess to receive a chip, the method further comprising:
   providing a chip in the recess of the faceplate; and
   the securing steps comprise securing the first and second ends of the wire to the chip.

7. The method of fabricating a wound antenna of claim 2, wherein the substrate provides a recess to receive a chip, the method further comprising:
   providing a chip in the recess of the substrate prior to pressing the faceplate against the substrate; and
   subsequent to pulling the faceplate away from the substrate, attaching the first and second ends of the wire to the chip.

8. The method of fabricating a wound antenna of claim 2, wherein the plurality of posts comprise telescoping posts and pressing the faceplate comprises compressing the telescoping posts to be flush with the faceplate.

9. The method of fabricating a wound antenna of claim 8, wherein the telescoping posts comprise a plurality of stepped rings and wrapping the wire comprises wrapping the wire around the outer peripheries of successive ones of the stepped rings to form the plurality of non-overlapping concentric wire coils.

10. The method of fabricating a wound antenna of claim 2, wherein the plurality of posts comprise a plurality of pins and pressing the faceplate against the substrate comprises pressing the pins through the substrate.

11. The method of fabricating a wound antenna of claim 2, wherein the plurality of posts comprise a plurality of spring loaded pogo-pins and pressing the faceplate against the substrate comprises compressing the pogo-pins.

12. The method of fabricating a wound antenna of claim 1, wherein the posts are positioned on tracks and the plurality of posts are configured to be moved along the tracks to vary a distance between posts to define pitch distances between the plurality of circumferential patterns, the method further comprising positioning at least a portion of the posts along the respective tracks to define the pitch distances between the plurality of circumferential patterns.

13. The method of fabricating a wound antenna of claim 1, wherein at least a portion of the posts are movable in a direction perpendicular to the faceplate, the method further comprising raising posts associated with respective ones of the plurality of concentric coil patterns while wrapping the wire.

14. The method of fabricating a wound antenna of claim 1, further comprising coating the antenna with a polymer to physically couple the plurality of wire coils prior to detaching the antenna from the faceplate, wherein attaching the antenna to the substrate occurs subsequent to the detaching.

15. A mandrel tool system for fabricating a mandrel wound antenna, the mandrel tool system comprising:
   a first substrate configured to support a plurality of posts, the posts arranged and disposed to define a plurality of non-overlapping circumferential patterns;
   a wiring head configured to receive a wire and dispense the wire;
   a manipulation subsystem coupled to at least one of the first substrate or the wiring head, the manipulation subsystem configured to move the first substrate and/or the wiring head relative to each other to wrap the wire being dispensed by the wiring head around outer peripheries of the plurality of posts to form a plurality of non-overlapping wire coils corresponding to the circumferential patterns to provide an antenna, a first end of the wire being secured at a first portion of the first substrate, a second end of the wire being secured to a second portion of the first substrate; and
   a wire cutter configured to cut the wire in proximity to the second end;
   wherein the first substrate is configured such that the antenna is detachable from the first substrate and the antenna is configured to be attached to a second substrate.

16. The mandrel tool system for fabricating the mandrel wound antenna of claim 15, wherein the first substrate comprises a faceplate and the manipulation subsystem is configured to press the faceplate and the antenna against the second substrate to attach the antenna to the second substrate, and pull the faceplate away from the second substrate to detach the antenna from the faceplate and the posts subsequent to being attached to the second substrate.

17. The mandrel tool system for fabricating the mandrel wound antenna of claim 16, wherein the faceplate is coupled to one of a heat source or an ultrasonic generator, the heat source or the ultrasonic generator being configured to heat the second substrate such that the wire coils are embedded in the second substrate while being pressed against the second substrate.

18. The mandrel tool system for fabricating the mandrel wound antenna of claim 16, further comprising a coating subsystem configured to apply an adhesive to the wire coils prior to the wire coils being pressed against the second substrate, the adhesive causing the wire coils to adhere to the second substrate.

19. The mandrel tool system for fabricating the mandrel wound antenna of claim 16, further comprising a coating subsystem configured to coat the wire coils with a polymer to physically couple the plurality of wire coils prior to the wire coils being detached from the faceplate, wherein the wire coils are attached to the second substrate subsequent to being detached.

20. The mandrel tool system for fabricating the mandrel wound antenna of claim 16, wherein the plurality of posts comprise at least one of:

telescoping posts configured to collapse to be flush with the faceplate upon being pressed against the second substrate;

pins configured to be pressed through the second substrate; and spring loaded pogo-pins configured to be compressed flush with the faceplate upon being pressed against the second substrate.

* * * * *